Oct. 10, 1944.  G. H. BOSS  2,359,822

ENGINE MOUNT

Filed Oct. 6, 1943

INVENTOR.
GERARD H. BOSS
BY
George Douglas Jones.
ATTORNEY

UNITED STATES PATENT OFFICE 2,359,822

ENGINE MOUNT

Gerard H. Boss, Middle River, Md., assignor to The Glenn L. Martin Company, Middle River, Md., a corporation of Maryland Application October 6, 1943, Serial No. 505,134

3 Claims. (Cl. 248—5)

This invention relates to an improvement in engine mounting structure of the type employed to support aircraft engines on the mounting bulkhead, or other mounting structure.

Engine mounts generally employed consist of a formed ring to which the struts and cross braces are welded. The engine mounting ring forms the basic structure to which the struts and braces are secured. The end of each strut must be properly contoured to form a proper intersection with the ring or adjoining strut or brace so that the bead of the weld may be laid along the intersection. For maximum strength as a cantilever structure and more particularly for traction stresses, these joints and welds must be carefully fabricated.

By this invention, an engine mount is provided of greatly simplified construction.

An object of this invention is the provision of an engine mount having high strength characteristics and a minimum number of formed and welded parts.

Another object of this invention is the provision of an engine mount wherein the traction stresses are carried primarily by continuous, unjoined tubing instead of by several welded connecting parts.

Further and other objects will become apparent from the description of the accompanying drawing which for a part of this disclosure and in which like numerals refer to like parts.

Figure 1:
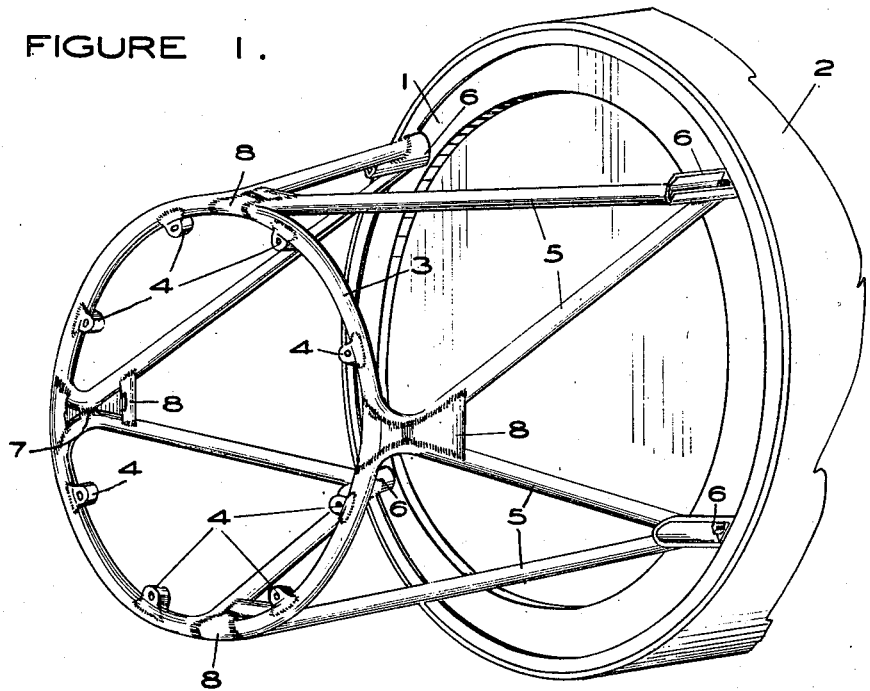
Figure 1 is a perspective view of the engine mount.
Figure 2:
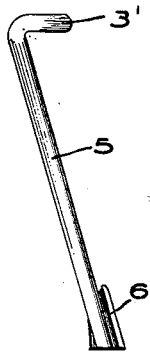
Figures 2, 3 and 4 are views of the formed unit comprising the engine mount.
Figure 3:
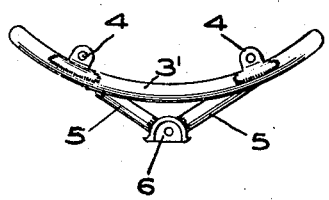
Figure 4:
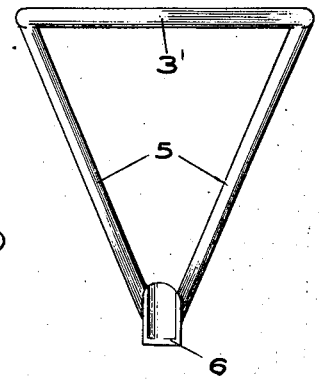

The engine mount shown in Figure 1, illustrating this invention, consists of four formed members similar to that shown in Figures 2 to 4, but it should be understood that any number of similar members may be used. Such an engine mount is used to mount the engine on the mounting bulkhead 1 of the nacelle 2. The engine (not shown) is mounted on ring 3 by means of lugs 4. Struts 5 support the mounting ring in spaced relation to the nacelle bulkhead. Fittings 6, to which the struts are secured, furnish a seat for the mounting nuts.

As shown in Figures 2 to 4, a continuous tubular member is bent so that its central portion 3' is curved to form a part of ring 3. The remainder of the tubular member is bent to form struts 5, the ends of which may be welded to a single fitting 6, or to separate fittings, or they may be formed to attach directly to the bulkhead. The important thing is that portion 3' and struts 5 are formed of a single tubular member.

Several such members as illustrated in Figures 2 to 4 are placed together so that portions 3' form an engine mounting ring 3. The contiguous portions of the members are welded, as shown at 7, through the cutout portion of gusset plate 8. Gusset plates are then welded between the adjoining frames to complete ring member 3 and reinforce struts 5.

The number of units required can be determined from calculations of the load and stresses involved. In every case, the tractive effort of the engine will be exerted on solid, unitary, tubular structures back to the single weld at the mounting fitting 6.

It is to be understood that certain changes, alterations, modifications and substitutions can be made without departing from the spirit and scope of the appended claims.

I claim as my invention:

1. A motor mount comprising a plurality of bent tubular members secured together to form an engine mounting ring and struts, said members each being formed from a single tubular member, the center portion of which is curved to form a portion of said engine mounting ring, the end portions of said tubular member being bent back of the plane of the ring segment to form mounting struts, the ends of said tubular member being secured to bulkhead mounting fittings, the plurality of members being secured together adjacent the ends of the ring segments to form a complete engine mounting ring.

2. A motor mount comprising a plurality of bent tubular members secured together to form an engine mounting ring and struts, said members each being formed from a single tubular member, the center portion of which is curved to form a portion of the engine mounting ring, the end portions being bent back of the plane of the ring segment to form mounting struts, the ends of the tube being secured to bulkhead mounting fittings, said plurality of members being secured together adjacent the ends of the ring segments to form a complete engine mounting ring, and gusset plates secured to adjacent members to complete the ring and reinforce the mount.

3. A motor mount having a mounting ring formed from a plurality of members secured together, each member formed from a single tubular member, the center portion of which is curved to form a segment of the ring, and the end portions thereof are bent back of the plane of the ring segment to form mounting struts.

GERARD H. BOSS.